United States Patent [15] 3,677,505
Van Taylor [45] July 18, 1972

[54] TAPE WINDING MECHANISM

[72] Inventor: George Van Taylor, Indianapolis, Ind.
[73] Assignee: RCA Corporation
[22] Filed: Aug. 10, 1970
[21] Appl. No.: 62,474

[52] U.S. Cl...........................242/56 R, 242/67.3 R, 242/74
[51] Int. Cl...........................B65h 19/20
[58] Field of Search..........242/56, 67.3, 58.6, 58.3, 180–181

[56] References Cited

UNITED STATES PATENTS

| | | | |
|---|---|---|---|
| 3,472,462 | 10/1969 | Young | 242/56 R |
| 3,477,657 | 11/1969 | Norbisrath | 242/56 R |
| 3,552,670 | 1/1971 | Herman | 242/56 R |
| 3,342,434 | 9/1967 | Conrad | 242/56 A X |
| 3,499,202 | 3/1970 | Napor | 242/67.3 X |
| 3,276,708 | 10/1966 | Yefsky | 242/67.3 R X |

*Primary Examiner*—Stanley N. Gilreath
*Assistant Examiner*—Milton Gerstein
*Attorney*—Eugene M. Whitacre

[57] ABSTRACT

A tape winding machine includes a supply reel of tape having a portion which is to be transferred to two hubs. The tape is unwound from the supply reel and is wound onto one of the hubs which is mounted on a rotatably driven spindle. The spindle is driven by a motor through a clutch. The other hub is mounted on a stationary spindle adjacent a staking mechanism. The staking mechanism stakes the tape to the second hub while the tape is in motion. The staking causes the clutch to slip and thereby abruptly terminate the rotation of the first hub.

25 Claims, 5 Drawing Figures

Patented July 18, 1972 3,677,505

3 Sheets-Sheet 1

INVENTOR
GEORGE VAN TAYLOR

BY David E. Pitchenik

ATTORNEY

INVENTOR.
GEORGE VAN TAYLOR
BY David E. Pitchenik
Attorney

INVENTOR.
GEORGE VAN TAYLOR
BY David E. Pitchenik
Attorney

TAPE WINDING MECHANISM

The present invention pertains to tape winding machines, and more particularly, to tape winding machines for manufacturing a subassembly to be utilized in a cassette tape cartridge.

In the manufacture of reel to reel cassette tape cartridges it is necessary to wind tape from a large supply reel onto the hubs used in the cassette. To do this, the free end of the tape on the supply reel is attached or staked to a cartridge hub and the tape unwound from the supply reel and onto the cartridge hub. When a sufficient amount of tape has been wound on the cartridge hub, the tape is cut and the cut end is attached to another cartridge hub.

This subassembly consisting of the two cartridge hubs and the attached tape is utilized as a subassembly in the cassette cartridge. As is well known, the subassembly is positioned with the cartridge pressure pads between the two halves of the cartridge housing or cover. The two halves are then secured together to form the complete cartridge. The tape wound onto the cassette hub may be either an unrecorded or a prerecorded tape. in In the manufacture of the subassembly it is desirable that the tape be accurately positioned at the point of attachment to each cartridge hub. The positioning should be such that the tape edges are aligned with the hub edges and not angled, or an edge of the tape will extend beyond the top or bottom of the hub. This insures uniform tape winding of the remaining tape over the attached portion. If the tape is not accurately positioned, with its edges in alignment with the tape hub, the tape may be wound on askew causing the tape reel to be thicker than the width of the tape hub and possibly wrinkle.

Should this occur when the housing halves are secured together, the tape may jam, rendering the cassette completely inoperative or subject to excessive friction during tape reeling because of insufficient clearance between the subassembly and the cartridge housing. The friction degrades the cassette performance during use by introducing tape speed variations which will cause wow and flutter.

In accordance with the present invention, a tape supply reel is adapted to have a portion of its tape transferred to two hubs. Means are provided to drive one of the hubs such that the tape from the supply reel as it unwinds is wound around the hub. Means are also provided for attaching the tape to the second hub while the tape is under tension.

A complete understanding of the present invention may be obtained from the following detailed description of a specific embodiment thereof, when taken in conjunction with the accompanying drawings, in which.

Figure 1:
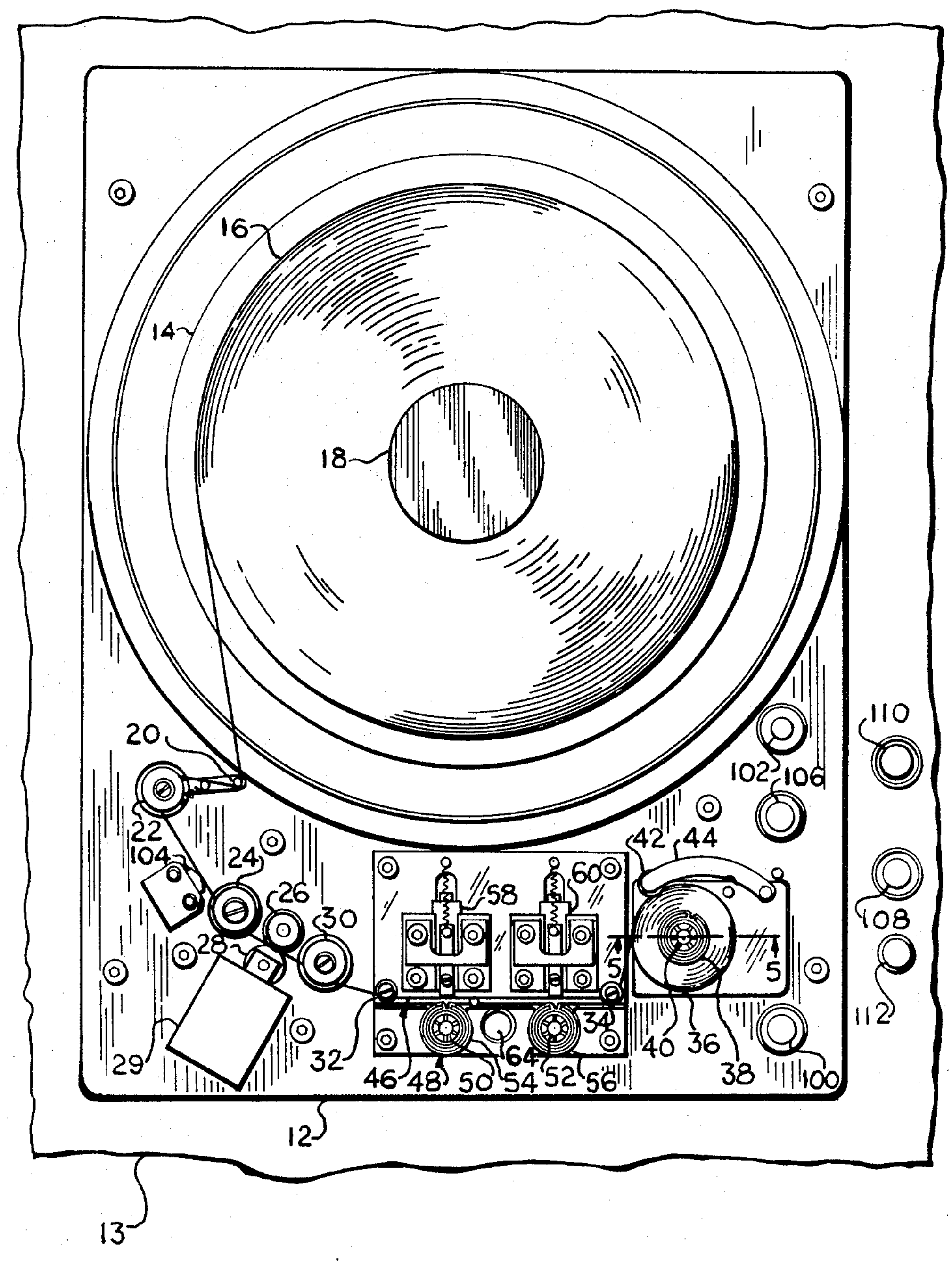
FIG. 1 is a top plan view of a tape winding machine embodying the present invention the moment before a staking operation.

Referring now to FIG. 1, the tape winding machine includes a base plate 12 mounted to a support structure or cabinet 13 and supporting a large supply reel 14. The supply reel 14 has a roll of tape 16 wound around the reel's hub 18. The hub 18 is mounted on a rotatable spindle, not shown.

The tape 16 is threaded around a spring biased tape tension pin 20, a guide 22, a guide 24, between a capstan 26 and a movable pressure roller 28, a guide 30, a guide 32, a guide 34 to the tape pack 36 wound around a takeup cartridge hub 38. The takeup cartridge hub is mounted to a rotatably driven spindle 40. The tape is guided onto the tape pack 36 by a guide 42 mounted at the end of the guide support arm 44. Arm 44 is pivotally mounted to the base plate 12 to permit the guide 42 to assume a position determined by the amount of tape on the takeup hub 38.

Figure 2:
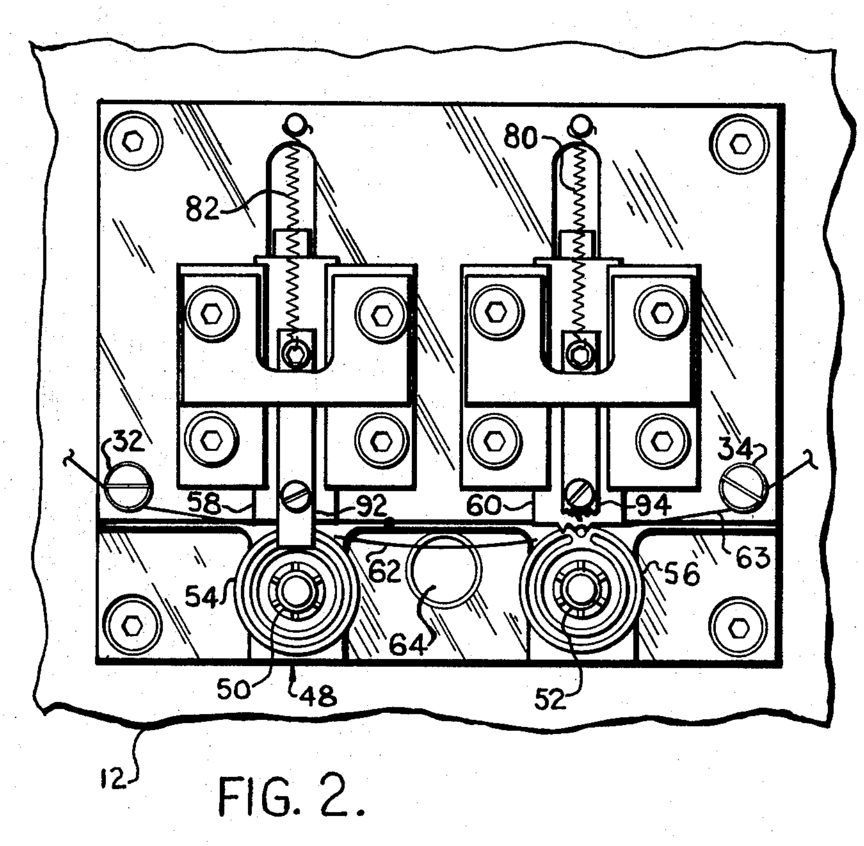
FIG. 2 is an enlarged top plan view of the staking mechanism shown in FIG. 1 partially broken away to show the staker and tape cutting structure the moment after a staking operation.

The tape guides 32 and 34 guide a portion 46 of the tape through the staking mechanism 48. The staking mechanism, best shown in FIGS. 2, 3 and 4, includes two stationary spindles 50 and 52 having cartridge hubs 54 and 56, respectively, mounted thereon. The cartridge hubs are mounted on the stationary spindles with the notched portion of each hub facing the staking hammers 58 and 60.

The machine functions to unwind a predetermined amount of tape from supply reel 14 and onto takeup cartridge hub 38. After this occurs, the tape is attached to the cartridge hubs 54 and 56 and cut at two points. A vacuum draws the cut excess scrap portion 62 of the tape (FIG. 2) into the scavenger hole 64 to be deposited in a scrap receptacle, not shown. The hubs 38 and 56 along with the attached tape, tape pack 36 and tape portion 63, form a complete subassembly. When the subassembly is removed from the winding machine, the tape tension is sufficient to permit the subassembly to be moved without the tape falling off cartridge hub 38. Cartridge hub 54 having the cut supply reel end of the tape 16 attached is transferred to the spindle 40 and two new cartridge hubs are mounted on the stationary spindles 50 and 52.

Figure 3:
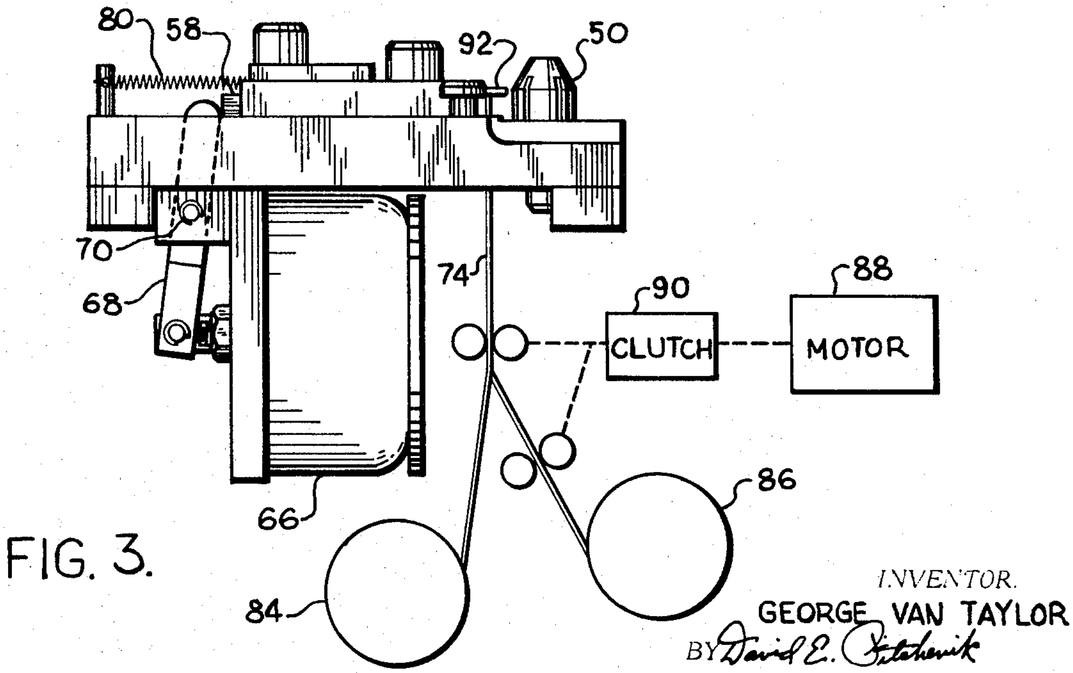
FIG. 3 is an enlarged left side view of the staking mechanism shown in FIG. 2 showing the wire staking material being fed into proper position for a staking operation.

The staking hammers 58 and 60 are driven by a solenoid operated striker lever. As is shown in FIG. 3, solenoid 66, when energized, causes lever 68 to pivot about fulcrum 70 to strike the rear of staking hammer 58 and drive it toward cartridge hub 54. Staking hammer 60 is operated in a similar manner. The staking of the tape to the cartridge hubs is accomplished by forcing a piece of wire such as a nylon or acetal resin wire into the cartridge keyhole shaped hub notch with the tape sandwiched between the wire and notch walls.

The front or striking face of each of the staking hammers 58 and 60 includes a cutting knife portion and a curved portion. Both striking hammers are identical, but are mounted in the machine in inverted relationship so that the cutting knife portion of each of the striking faces are adjacent, to cut the tape 62 between the cartridge hubs 54 and 56.

Figure 4:
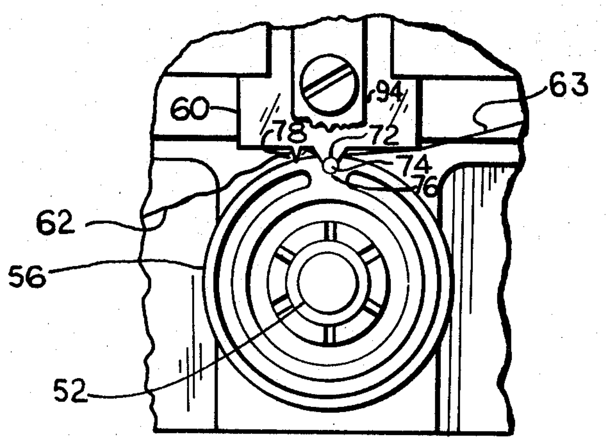
FIG. 4 is an enlarged fragmentary view of the staker and tape cutting structure shown in FIG. 2.

As can be seen in FIG. 4, the face of the staking hammer 60 includes a curved portion 72 which bears against the staking wire 74 and forces it into the keyhole slot 76 to attach the tape to the cartridge hub 56. The wire 74 is shown positioned in the keyhole slot 76. The cutting knife portion 78 of the staking hammer face cuts the tape using the cartridge hub as an anvil. After the tape is staked to the cartridge hub, the staking hammer is withdrawn from the cartridge hub 56 under the action of the bias spring 80.

The dimensions of the curved portion 72 and the cutting knife portion 78 are selected to almost completely stake the tape to the hub prior to cutting the tape. For example, the tape can be cut during the last 5/1,000 inch movement of the staking hammers toward the cartridge hub; however, the dimensions are not critical to the present invention. As was indicated above, staking hammer 58 is structurally identical to hammer 60 but mounted in the machine inverted with respect to hammer 60. That is, whereas the cutting knife portion 78 is shown to the left of the curved portion 72 in FIG. 4, the cutting knife portion of the staking hammer 58 would be to the right of its respective curved portion. The staking hammer 58 is withdrawn from the cartridge hub 54 after a staking operation under the action of the bias spring 82.

Referring again to FIG. 3, the wires utilized in staking the tape to the cartridge hubs 54 and 56 are supplied from wire supply spools 84 and 86 and are driven by a motor 88-clutch 90 arrangement. The wire is unwound from the spools, driven up through openings in the base plate 12 and forced against stops 92 and 94 which are mounted on the top of the staking hammers 58 and 60 and extend beyond the front face of each staking hammer.

The openings in the base plate 12 are located to position the staking wires in front of the curved portions of the staking hammers. When the staking wire end bears against the underside of the overhanging portions of the stops 92 and 94, the friction clutch 90 slips preventing the wire from being jammed.

When the solenoids are energized, the staking hammers 58 and 60 are driven toward the notched portion of the cartridge hubs 54 and 56 and the curved portion of each staking hammer, as it begins its excursion toward its respective cartridge hub, bears against its respective staking wire. Further movement of the staking hammers toward the hubs shears off the portion of the wire used in the staking operation.

The undersides of the staking hammers 58 and 60 now act as the stops for the free end of each wire. Once the staking hammers are retracted under the action of the bias springs 80 and 82 after the staking operation has been accomplished, the friction clutch 90 no longer slips and each wire is driven through its opening in the base plate 12 until the free end of wire again bears against the underside of the stops 92 and 94.

To insure that the staking of the tape to the cartridge hubs 54 and 56 is properly accomplished with the tape squarely aligned with respect to the hubs, the staking operation occurs while the tape is being wound on the takeup hub 38. Thus, the tape is under tension at the time it is staked. When the staking occurs, it is necessary that the pressure roller 28 be retracted into the housing 29 to avoid unwinding additional tape off the supply reel 14 which may foul or tangle. More important, however, is that the rotational force applied to the takeup cartridge hub 38 via spindle 40 immediately cease. Should this not occur, the wire staking the tape to the cartridge hub 56 will be pulled out from the notch, unstaking the tape.

Figure 5:
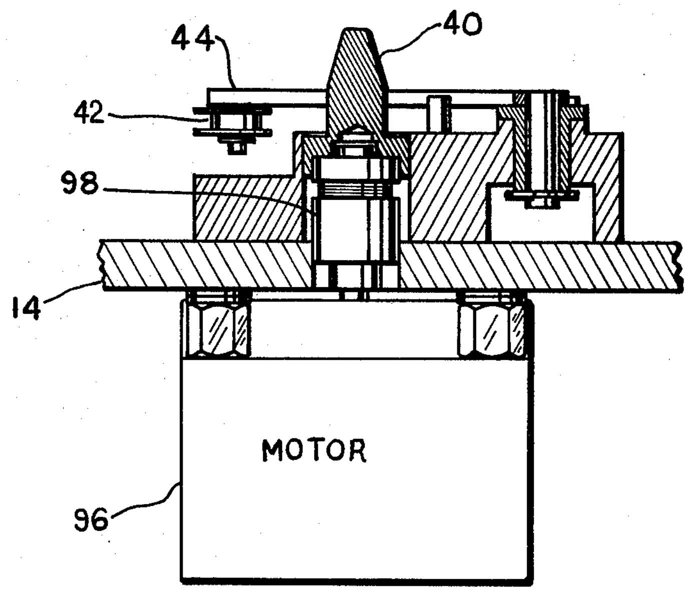
FIG. 5 is an enlarged partial section view taken along the lines 5-5 in FIG. 1 to show the takeup hub spindle motor and clutch structure.

To permit the takeup cartridge hub 38 to be abruptly stopped, the takeup spindle 40 is driven from a motor 96 through a slip clutch 98 (see FIG. 5). The spindle 40 is driven at a sufficiently high rate of speed in relation to the tape speed (imparted by the capstan 26 and pressure roller 28) to maintain a continuous tension on the tape between the takeup hub and the point where the capstan 26 and pressure roller 28 engage the tape. A typical tape speed may be approximately 150 inches per second.

The tension is provided because the free or unloaded running speed of the spindle 40 is greater than its operating speed during a tape winding operation. The tape acts against the spindle torque transmitted from the motor 96 through the clutch 98. The tensile strength of the tape is sufficient to prevent it from being ripped or stretched during winding. Moreover, the slip torque of the clutch 98 is greater than the torque of the motor 96 which is being held back from running at its unloaded speed by the tape acting via the cartridge hub 38, the spindle 40 and the clutch 98. Thus, the tape is under tension as it is wound onto the takeup cartridge hub 38 during the tape winding operation. The limiting tension is the amount of force required to cause clutch 98 to slip.

When staking occurs, the rotation of the takeup cartridge hub 38 is abruptly terminated under the restraining force of the end of the tape staked to the cartridge hub 56. This causes the slip clutch 98 to slip and disconnect the motor shaft from the spindle 40. As a consequence, continued rotation of the motor 96 after it is de-energized, due to inertia, does not cause the staked tape end to be pulled out from the cartridge hub 56.

The completed subassembly with the unrecorded or prerecorded tape staked to the cartridge hubs 38 and 56 is removed from the tape winding machine and cartridge hub 54 with the staked end of the supply reel tape 16 is taken off the stationary spindle 50 and mounted on the spindle 40. New cartridge hubs are mounted on the stationary spindles 50 and 52 to prepare the machine for a new tape winding operation.

Several pushbutton controls are employed to operate the tape winding machine. Button 100 (FIG. 1) starts the machine for a winding operation and causes the vacuum to be applied to the scavenger hole 64. The winding may be stopped by the actuation of stop button 102. Under normal use, however, the winding continues until a staking operation has been completed. Usually, the staking operation occurs in response to the detection of a prerecorded trip tone on the tape 16 by the trip tone transducer 104 shown in FIG. 1 between tape guides 22 and 24. Where the tape is an unrecorded tape, the staking may occur after a predeterMined reeling time. This enables the machine operator to operate several machines simultaneously and substantially reduces the manufacturing cost of the subassembly.

To permit the machine operator to perform individual functions, should they be needed, button 106 operates to cause the vacuum to be applied to the scavenger hole 64 so that snarled tape, after it is cut free, may be passed through the scavenger hole into the scrap receptacle. Button 108 controls the staking hammers 58 and 60 to permit the staking of tape to cartridge hubs mounted on the stationary spindles 50 and 52 to be subject to manual control.

Button 110 operates to cause the staking wires to be driven by the motor 88-clutch 90 arrangement and is utilized mainly in loading of the winding machine with a reel of staking wire. The path of the staking wire is such that it causes a switch connected in parallel with button 110 to be normally closed. This switch is open circuited when the staking wires completely unravel from the spools 84 and 86 and no longer biases the switch into its closed position. When this occurs, indicator light 112, which is normally on during operation of the winding machine, extinguishes to provide a visual indication to the machine operator that the machine is not conditioned for a tape winding operation.

What is claimed is:

1. A tape winding machine comprising:
- a first and a second hub;
- a reel of supply tape, a portion of which is adapted to be transferred to said first and said second hub;
- means for driving said first hub such that said tape from said supply reel is wound therearound as said tape from said supply reel unwinds, said driving means including a clutch connected to permit the rotation of said first hub to be abruptly terminated when said tape is attached to said second hub; and
- means for attaching said tape to said second hub while said tape is being wound on said first hub, the attachment of said tape to said second hub causing the rotation of said first hub to abruptly terminate.

2. A tape winding machine as defined in claim 1 wherein said means for attaching is actuated by the detection of a trip tone prerecorded on said tape.

3. A tape winding machine as defined in claim 1 including a third hub and wherein said means for attaching additionally attaches said tape to said third hub when said tape is attached to said second hub.

4. A tape winding machine as defined in claim 1 wherein said means for attaching attaches said tape to said hub by wedging said tape in a notch in said hub with a staking wire.

5. A tape winding machine as defined in claim 1 wherein said means for attaching is actuated by the detection of a trip tone prerecorded on said tape.

6. A tape winding machine as defined in claim 5 including a third hub and wherein said means for attaching additionally attaches said tape to said third hub when said tape is attached to said second hub.

7. A tape winding machine as defined in claim 6 wherein said means for attaching attaches said tape to said hub by wedging said tape in a notch in said hub with a staking wire.

8. A tape winding machine as defined in claim 7 wherein said staking wire is automatically fed into position.

9. A tape winding machine as defined in claim 4 wherein said staking wire is automatically fed into position.

10. A tape winding machine comprising:
- a first and second hub;
- a reel of supply tape, a portion of which is adapted to be transferred to said first and said second hubs;
- means for driving said first hub such that said tape from said supply reel is wound therearound as said tape from said supply reel unwinds;

means for attaching said tape to said second hub by wedging said tape in a notch in said hub with a staking wire while said tape is under tension, said attaching means including a staking hammer, said hammer having a face with a cutting knife portion adapted to cut the tape and a curved portion adapted to cooperate with and bear against said staking wire, said face portion dimensioned such that the attachment of the tape to said hub is almost completed prior to the cutting of said tape; and means for automatically feeding said staking wire into position.

11. A tape winding machine as defined in claim 10 wherein means are provided for automatically feeding said staking wire into position.

12. A tape winding machine as defined in claim 11 including a second staking hammer having a face with a cutting knife portion adapted to cut the tape and a curved portion adapted to cooperate with and bear against a staking wire.

13. A tape winding machine as defined in claim 12 including a scavenger hole adjacent said staking hammers for removing scrap cut tape under the action of a vacuum applied to said hole.

14. A tape winding machine, comprising:

a first and a second hub;

a tape, a portion of which is to be transferred to said first and said second hub;

means for rotating said first hub to cause said tape to be wound therearound, said rotating means including a slip clutch having a slip torque which is less than the tensile strength of said tape;

stationary support means for supporting said second hub; and means for attaching said tape to said second hub while said tape is being wound around said first hub, the attachment of said tape to said second hub causing the rotation of said first hub to abruptly terminate.

15. A tape winding machine, comprising:

a first and a second hub;

a supply reel of tape, a portion of which is to be transferred to said first and said second hub;

a capstan and a pressure roller engageable with said tape to unwind said tape from said reel;

a rotatably driven spindle adapted to support said first hub and driven from a motor through a slip clutch having a predetermined slip torque;

a stationary spindle adapted to support said second hub;

staking means positioned adjacent said stationary spindle and adapted to stake said tape to said second hub; and said predetermined slip torque of said clutch such that said clutch slips and disengages said rotatably driven spindle from said motor when said tape is staked to said second hub.

16. A tape winding machine as defined in claim 15 wherein said clutch slip torque is greater than the torque of said motor.

17. A method for transferring tape from a supply reel to a first and a second hub, comprising the steps of:

attaching the tape on the supply reel to said first hub;

mounting said first hub on a rotatable spindle;

driving said spindle through a slip clutch causing said first hub to rotate causing the tape to wind around said first hub;

mounting said second hub on a stationary spindle; and staking said tape to said second hub so that said clutch slips and disengages said rotatable spindle from said motor when said tape is staked to said second hub.

18. A method for transferring tape from a supply reel to a first and a second hub as defined in claim 17 wherein the torque of said slip clutch is greater than the torque of said motor.

19. A method for transferring tape from a supply reel to a first and a second hub, comprising the steps of:

attaching said tape on the supply reel to said first hub;

driving said first hub through a clutch connected to permit the rotation of said first hub to be abruptly terminated when said tape is attached to said second hub and such that said tape from said supply reel is wound around said first hub as said tape unwinds from said supply reel;

attaching said tape to said second hub while said tape is being wound on said first hub; and terminating the rotation of said first hub when said tape is attached to said second hub.

20. A method for transferring tape from a supply reel to a first and a second hub as defined in claim 19 wherein the tape is attached to the second hub when a prerecorded trip tone on the tape is detected.

21. A method for transferring tape from a supply reel to a first and a second hub as defined in claim 19 including the step of attaching the tape from the supply reel to a third hub when the tape is attached to said second hub.

22. A method for transferring tape from a supply reel to a first and a second hub as defined in claim 21 wherein said tape is attached to said second hub by wedging said tape into a notch in said hub with a staking wire and including the step of automatically feeding staking wire into predetermined positions adjacent said first and second hub.

23. A method for transferring tape from a supply reel to a first and a second hub as defined in claim 19 including the step of cutting said tape at a point intermediate said supply reel and said second hub after a sufficient quantity of tape has been wound around said first hub.

24. A method for transferring tape from a supply reel to a first and a second hub as defined in claim 23 including the step of attaching said tape to a third hub when said tape is attached to said second hub and cutting said tape between said second and third hubs.

25. A method for transferring tape from a supply reel to a first and a second hub as defined in claim 19 wherein said slip clutch has a slip torque which is less than the tensile strength of said tape.

* * * * *